United States Patent [19]
Amundson et al.

[11] Patent Number: 6,154,852
[45] Date of Patent: Nov. 28, 2000

[54] METHOD AND APPARATUS FOR DATA BACKUP AND RECOVERY

[75] Inventors: Daniel L. Amundson; Donald Ray Halley; Paul Douglas Koeller; Leonard William Koser; Lynda Marie Smith, all of Rochester, Minn.

[73] Assignee: International Business Machines Corporation, Armonk, N.Y.

[21] Appl. No.: 09/095,476

[22] Filed: Jun. 10, 1998

[51] Int. Cl.[7] .................................................. G06F 11/00
[52] U.S. Cl. .............................................. 714/5; 711/114
[58] Field of Search ................................. 714/5, 6, 2, 8, 714/15, 16, 20, 21, 25, 42, 44; 711/114, 115, 133; 395/650, 700

[56] References Cited

U.S. PATENT DOCUMENTS

| | | | |
|---|---|---|---|
| 5,134,696 | 7/1992 | Brown et al. | 395/425 |
| 5,210,866 | 5/1993 | Milligan et al. | 395/575 |
| 5,388,266 | 2/1995 | Frey et al. | 395/700 |
| 5,450,579 | 9/1995 | Johnson | 395/650 |
| 5,463,733 | 10/1995 | Forman et al. | 395/182.08 |
| 5,475,834 | 12/1995 | Anglin et al. | 395/600 |
| 5,502,811 | 3/1996 | Ripberger | 395/182.04 |
| 5,515,502 | 5/1996 | Wood | 395/182.13 |
| 5,530,855 | 6/1996 | Satoh et al. | 395/600 |
| 5,555,371 | 9/1996 | Duyanovich et al. | 395/182.11 |
| 5,644,696 | 7/1997 | Pearson et al. | 395/182.04 |
| 5,671,349 | 9/1997 | Hashemi et al. | 395/182.04 |
| 5,671,350 | 9/1997 | Wood | 395/182.13 |
| 5,673,381 | 9/1997 | Huai et al. | 395/180 |
| 5,680,539 | 10/1997 | Jones | 395/182.04 |
| 5,920,703 | 7/1999 | Campbell et al. | 395/200.66 |

FOREIGN PATENT DOCUMENTS

0767431A1  4/1997  European Pat. Off. .

OTHER PUBLICATIONS

IBM Technical Disclosure Bulletin, "Tape Array Backup for DASD Array", vol. 38, No. 06, Jun. 1995.

*Primary Examiner*—Robert W. Beausoliel, Jr.
*Assistant Examiner*—Nadeem Iqbal
*Attorney, Agent, or Firm*—Joan Pennington

[57] ABSTRACT

A method, computer program product and apparatus are provided for data backup and recovery in a computer system. The data backup and recovery method uses a plurality of tape drives in parallel. A unique token is associated with each data object being saved to a tape media. While saving backup data to the plurality of tape drives, a dynamic load balancer dynamically balances the load between the plurality of tape drives. While recovering backup data from tape media, the unique token is utilized for processing tape media files in any order. Data segments of one or more objects are distributed across the parallel tape devices and are non-serial across the tape media files used. When recovering backup data from tape media, the same number or fewer tape drives than used during data saving can be used.

11 Claims, 14 Drawing Sheets

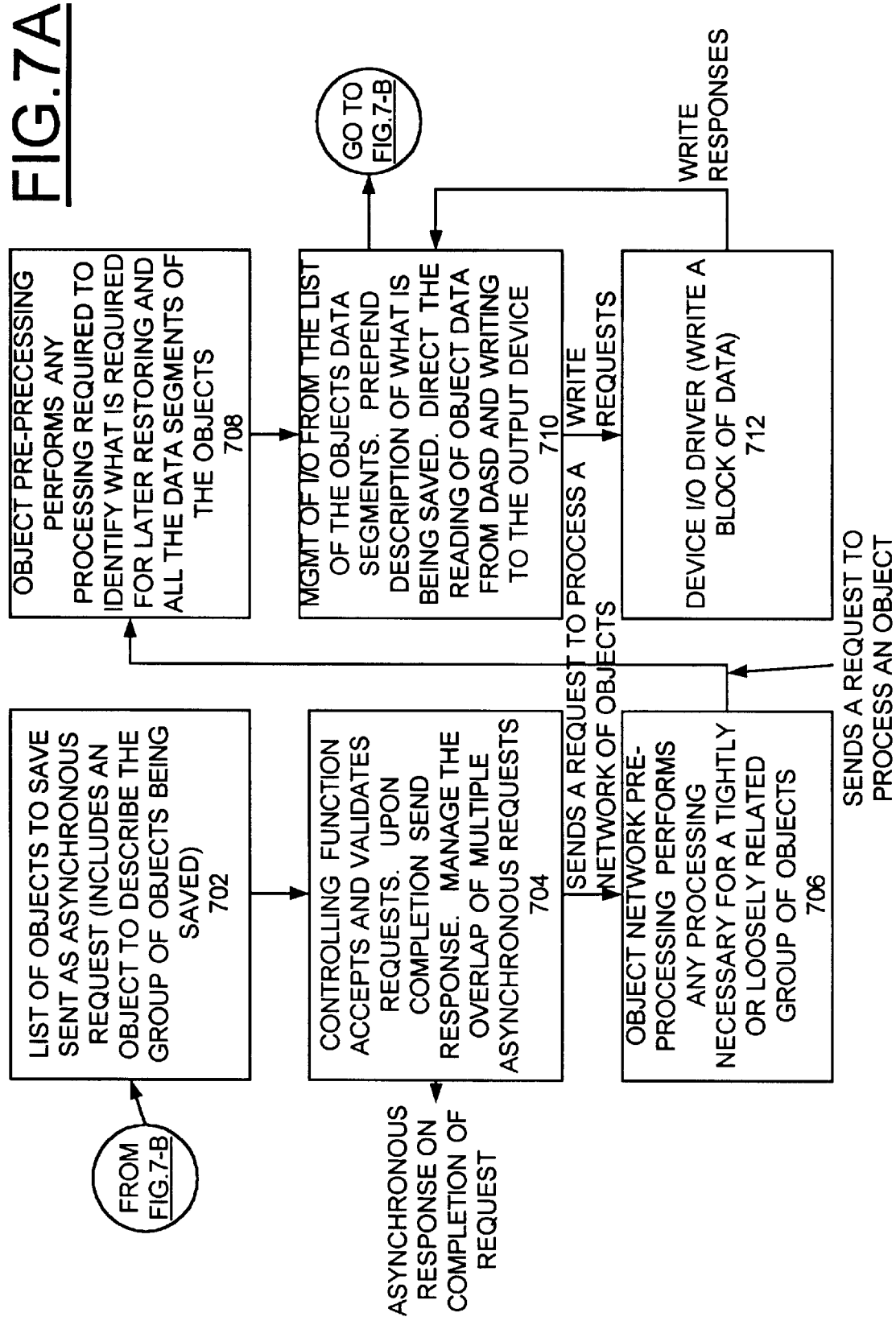

METHOD AND APPARATUS FOR DATA BACKUP AND RECOVERY

FIELD OF THE INVENTION

The present invention relates generally to a data processing system and more particularly to a method and apparatus for data backup and recovery.

DESCRIPTION OF THE RELATED ART

Data processing systems include various types of memory to process and store data. Auxiliary memory typically includes direct access storage devices (DASDs). Tape drives have been used to store a backup copy of objects from the DASD onto removable tape media. For example, in the International Business Machines Corporation Application System/400 (AS/400) computer system, the OS/400 operating system provides users with commands that allow users to make a backup copy of objects from the DASD onto removable media, such as tape backup. The backup and recovery commands allow the user to specify multiple tape drives to be used serially. In the current support this data all goes to one output device as a stream of data in the sequence determined by the ordering of the objects to be saved. There is overlap between the various functional units of code but there is no overlap in the writing of the save/restore data to the output devices. When one tape is full the backup operation continues with the next tape drive while the tape is being rewound on the previous drive. The minimum time required to perform a backup or restore of a single large data object is limited to the speed of the fastest tape drive available.

A need exists for a fast method for making a backup copy of large data objects from Direct Access Storage Devices (DASD) onto removable tape media. The backup and recovery should be simple to perform and complete as quickly as possible using all available tape drives. Furthermore, recovering the data from tapes should be possible using fewer tape devices than were available when the backup was performed. Finally the user should not have to maintain a particular order of the tape files during the recovery process. As used in the present specification and claims, the term tape drives includes other forms of backup media, such as optical media, DASDs, and remote servers.

SUMMARY OF THE INVENTION

A principal object of the present invention is to provide an improved method, computer program product and apparatus for data backup and recovery in a computer system. Other important objects of the present invention are to provide such method, computer program product and apparatus for data backup and recovery substantially without negative effects and that overcome many disadvantages of prior art arrangements.

In brief, a method, computer program product and apparatus are provided for data backup and recovery in a computer system. The data backup and recovery method uses a plurality of tape drives in parallel. A unique token is associated with each data object being saved to a tape media. While saving backup data to the plurality of tape drives, a dynamic load balancer dynamically balances the load between the plurality of tape drives. While recovering backup data from tape media, the unique token is utilized for processing tape media files in any order.

In accordance with features of the invention, data segments of one or more objects are distributed across the parallel tape devices and are non-serial across the tape media files used. When recovering backup data from tape media, the same number or fewer tape drives than used during data saving can be used.

BRIEF DESCRIPTION OF THE DRAWINGS

The present invention together with the above and other objects and advantages may best be understood from the following detailed description of the preferred embodiments of the invention illustrated in the drawings, wherein:

FIGS. 7A and 7B are flow charts illustrating operations for data backup for saving data to a single device of the preferred embodiment;

DETAILED DESCRIPTION OF THE PREFERRED EMBODIMENTS

Figure 1:
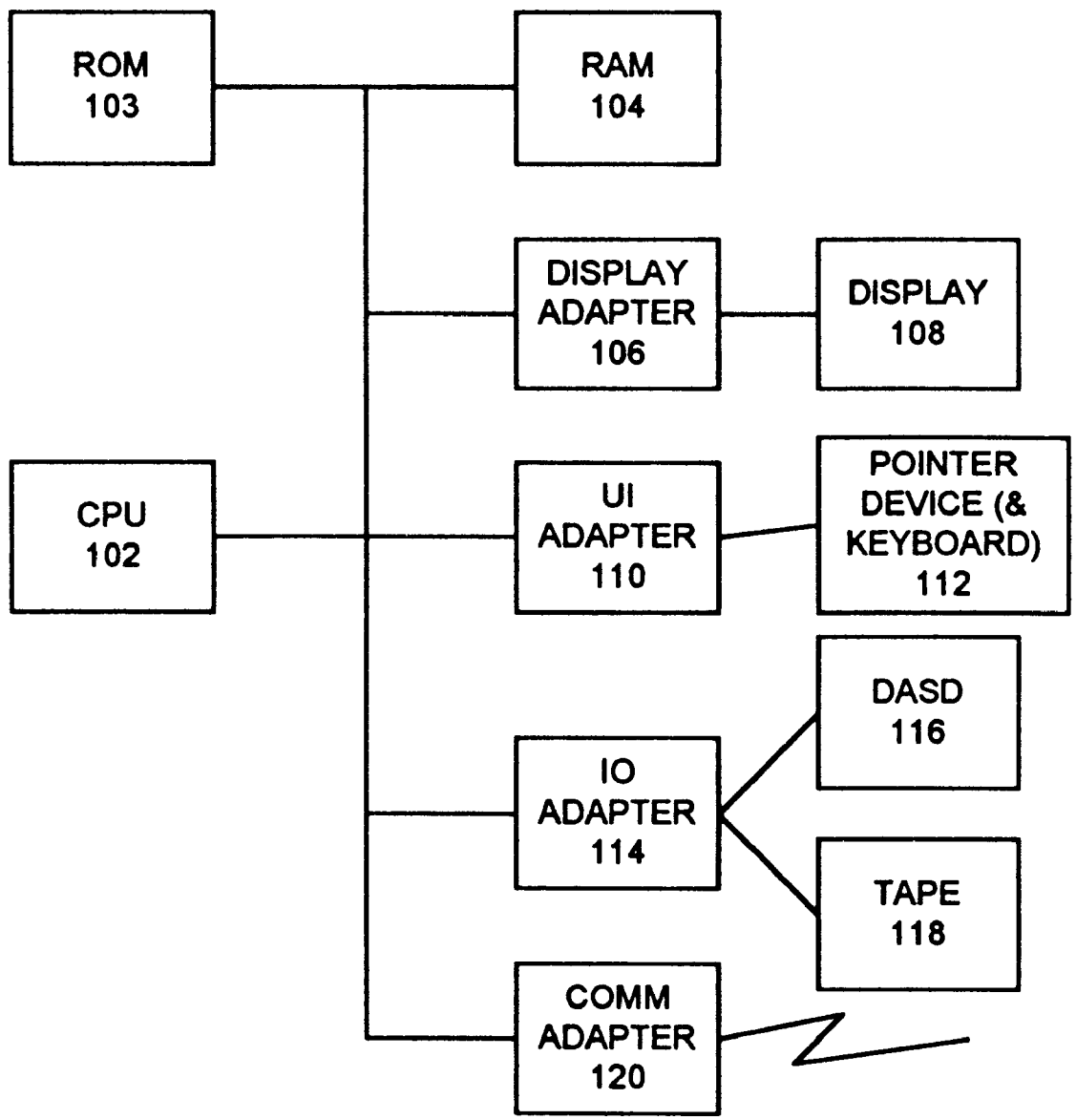
FIGS. 1 and 2 are block diagram representations illustrating a computer system, operating system and data object definitions for implementing methods for data backup and recovery in accordance with the preferred embodiment.
Figure 2:
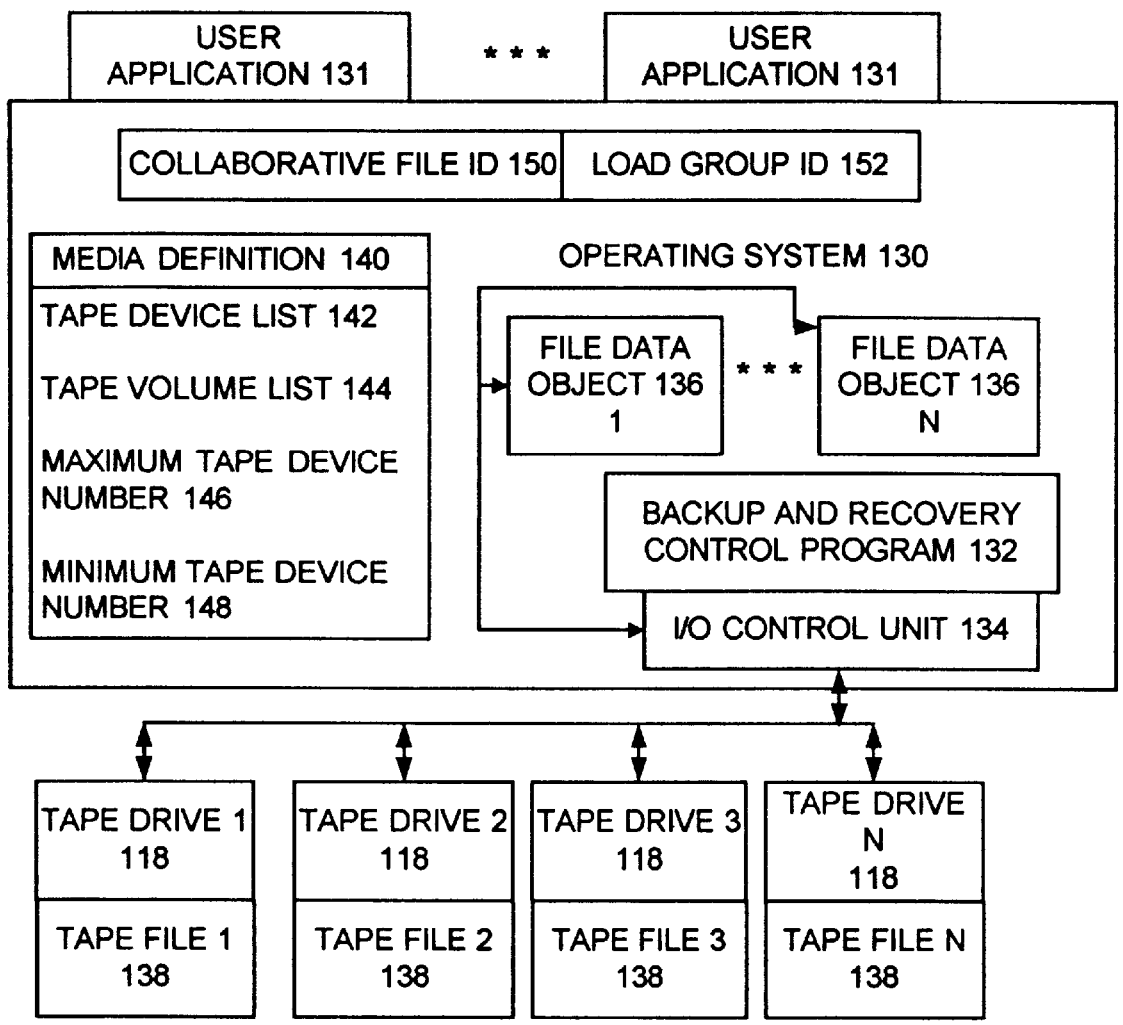

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory or mainstore 104, and a display adapter 106 coupled to a display 108. CPU 102 is connected to a user interface (UI) adapter 110 connected to a pointer device and keyboard 112. CPU 102 is connected to an input/output (I/O) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130 supporting multiple applications 131, a data backup and recovery control program 132 of the preferred embodiment used in conjunction with a I/O control unit 134. In accordance with a feature of the invention, to backup a large data object 136, multiple tape drives (1-N) 118 are used in parallel with dynamic load balancing. There is a tape file 138 associated with each tape device 118. A data object called a media definition 140 specifies a tape device list 142 of tape devices that are eligible to be used to perform the backup, a tape volume list 144 of tape volumes that are eligible to be used to perform the backup, a maximum number 146 of tape devices that can be used to perform the backup, and a minimum number 148 of tape devices that are required to perform the backup. The tape devices 118 can be either stand alone tape devices or the names of tape media library devices that contain multiple tape devices. A unique collaborative file ID 150 is associated with each piece of data written to tape media for each data backup. A unique load group ID 152 is appended to the collaborative file ID 150 during recovery processing.

Various commercially available processors could be used for computer system 100, for example, an IBM personal computer or similar workstation can be used. An example of a specific computer system on which the invention may be implemented is the International Business Machines Corp. AS/400 computer system. Central processor unit(s) 102 is suitably programmed to execute the flowcharts of FIGS. 6A, 6B, 6C, 7A, 7B, 8, and 9, to process save and restore functions of the preferred embodiment. Control program 132 provides the suitable programming for the central processor unit 102 to perform the methods of the preferred embodiment.

In accordance with features of the preferred embodiment, a load balancing algorithm dynamically adjusts to the real time performance of the multiple output devices 118 while saving data using an Enhanced Parallel Backup and Recovery method. Data segments are the scattered pieces of one or more objects 136 distributed across tape media of the parallel tape devices 118 and are non-serial across the volume sets used. When restoring from tape media created using the Enhanced Parallel Backup and Recovery method the same number or fewer devices 118 than used during the save are used and the volume sets can be processed in any order with a single pass across each volume set.

In computer system 100, the backup commands in accordance with the preferred embodiment allow the user to specify that multiple tape drives 118 should be used in parallel to backup a single large data object 136. To use this support, the user creates and names a new object called the media definition 140. When the user runs a backup command the user specifies the name of the media definition 140. The backup command determines which of the specified tape devices 118 are available for use. If the number of available tape devices does not meet the minimum number 148 specified in the media definition 140 then the backup will not be performed. If the minimum number of tape drives 118 are available then the backup operation allocates as many tape drives as possible up to the maximum number 146 specified in the media definition.

Once the tape drives have been allocated, the backup operation begins. The backup operation can process multiple data objects 136 of varying size. As illustrated and described with respect to FIGS. 6A, 6B and 6C, the backup process uses load balancing to spread the objects across all of the tape devices 118 that are being used. The tape file 138 associated with each tape drive 118 typically will consist of a single tape volume, if the amount of data is large enough then the tape file 138 may span several tape volumes. Small data objects 136 are grouped together and written to a single tape device 118. Large objects 136 are split into data segments and are spread across multiple tape devices 118.

As part of the backup process a load/dump (L/D) descriptor 502 and a save/restore (S/R) descriptor 504 (FIGS. 5A, 5B), are written on each tape file 138. The S/R descriptor 504 contains information about all of the objects 508 which are included in the backup operation. The L/D descriptor 502 contains information about the data object segments 508 which make up large objects 136 and records which data object segments 508 have been written on this particular tape file 138. Because the descriptors 502 and 504 are written on each of the tape files 138, the order of the tape files 138 is not important during the recovery process illustrated and described with respect to FIG. 9. The Load/Dump descriptor 502 includes the unique collaborative file ID 150.

Figure 3:
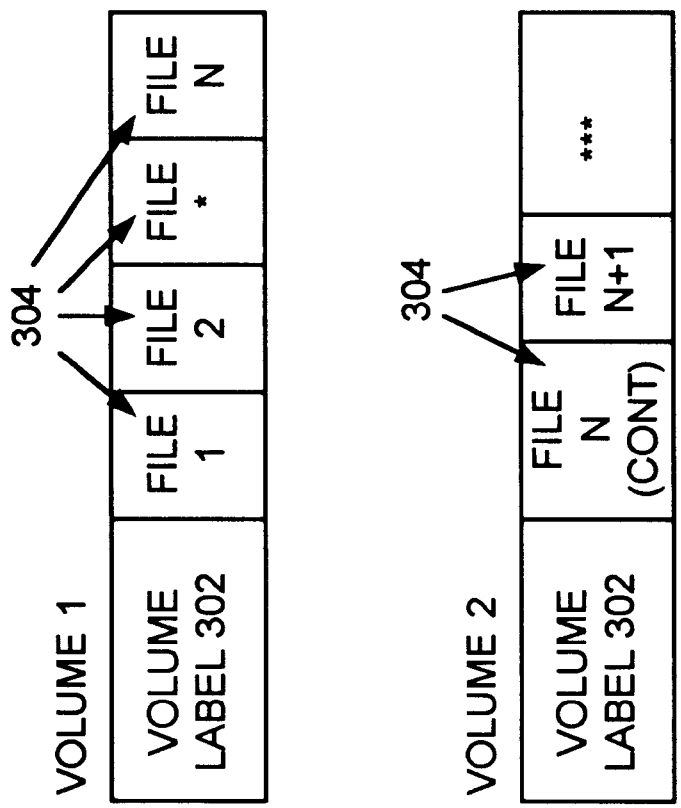
FIG. 3 is a diagram illustrating a conventional multi-volume file sequence set.
Figure 4:
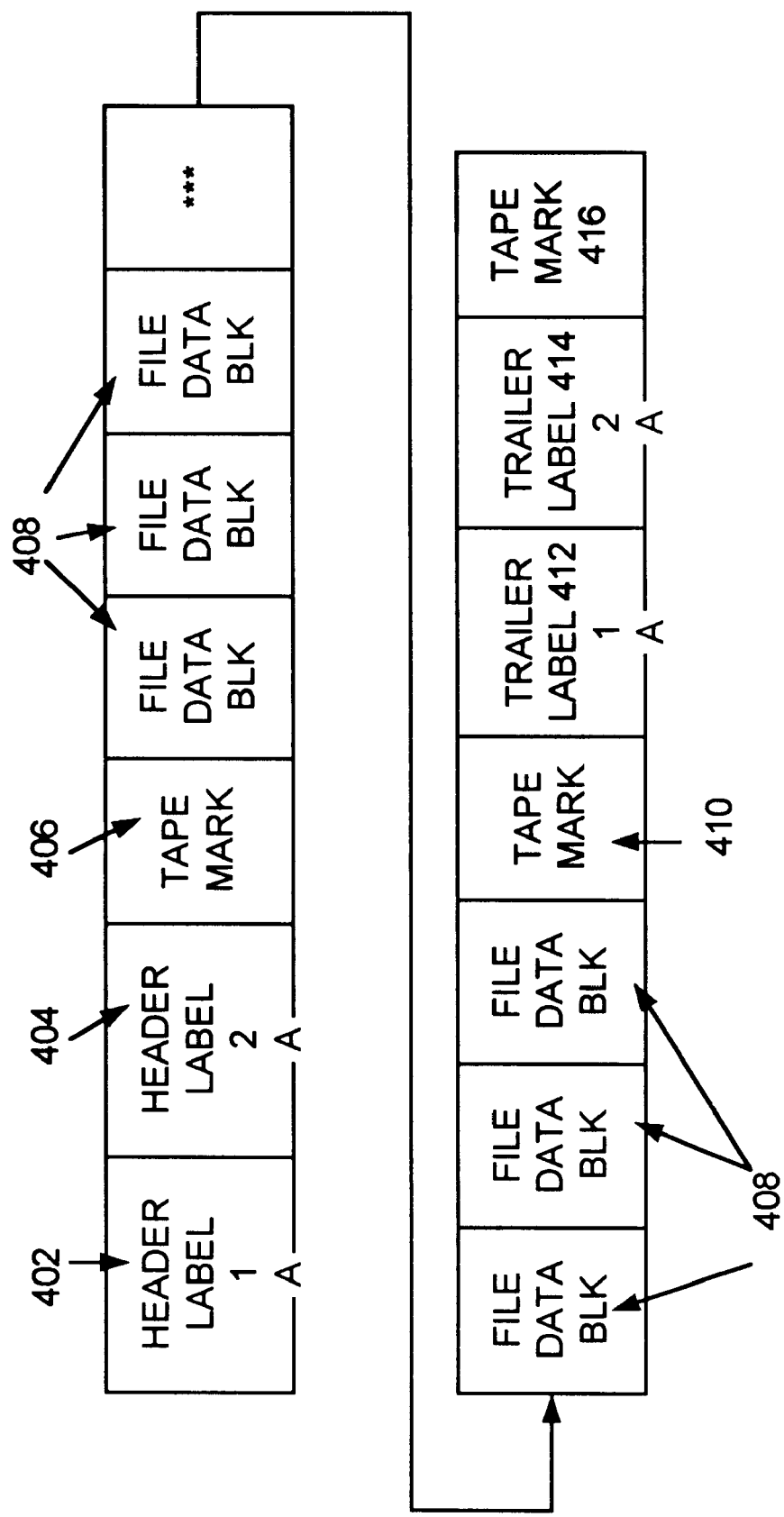
FIG. 4 is a diagram illustrating a conventional tape file format.

FIGS. 3 and 4 show how data is currently formatted on a standard labeled tape. FIG. 3 provides an example of a multi-volume file sequence set including volumes 1 and 2. Volume 1 includes a volume label 302 and files 304 1–n. Volume 2 similarly includes a volume label 302 and files 304 from n continued. Volume labels are not affected by the Enhanced Parallel Backup and Recovery method of the preferred embodiment. FIG. 4 provides an example of a standard labeled tape file. The tape includes two header labels 402 and 404, a tape mark 406 followed by multiple file data block 408 labeled FILE DATA BLK, another tape mark 410, and two trailer labels 412 and 414, and a third tape mark 416. Header and trailer labels 402, 404, 412, and 414 are not affected by Enhanced Parallel Backup and Recovery operations of the preferred embodiment. That is, a display of the file header information 402 and 404 by any system will not provide any information as to whether a file contains complete backup data or part of the backup data.

Figure 5A:
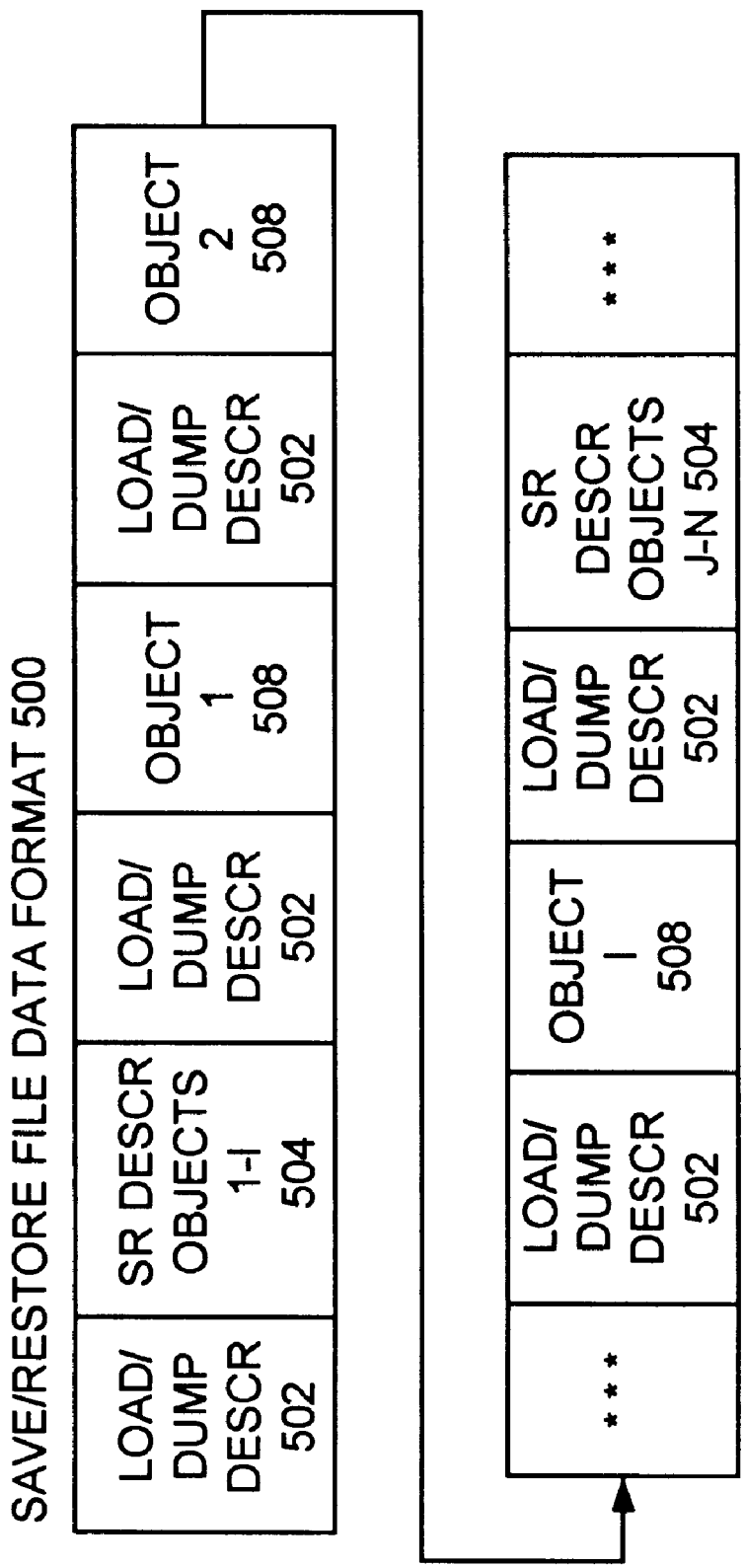
FIGS. 5A and 5B are diagrams illustrating exemplary save/restore data file formats of the preferred embodiment.
Figure 5B:
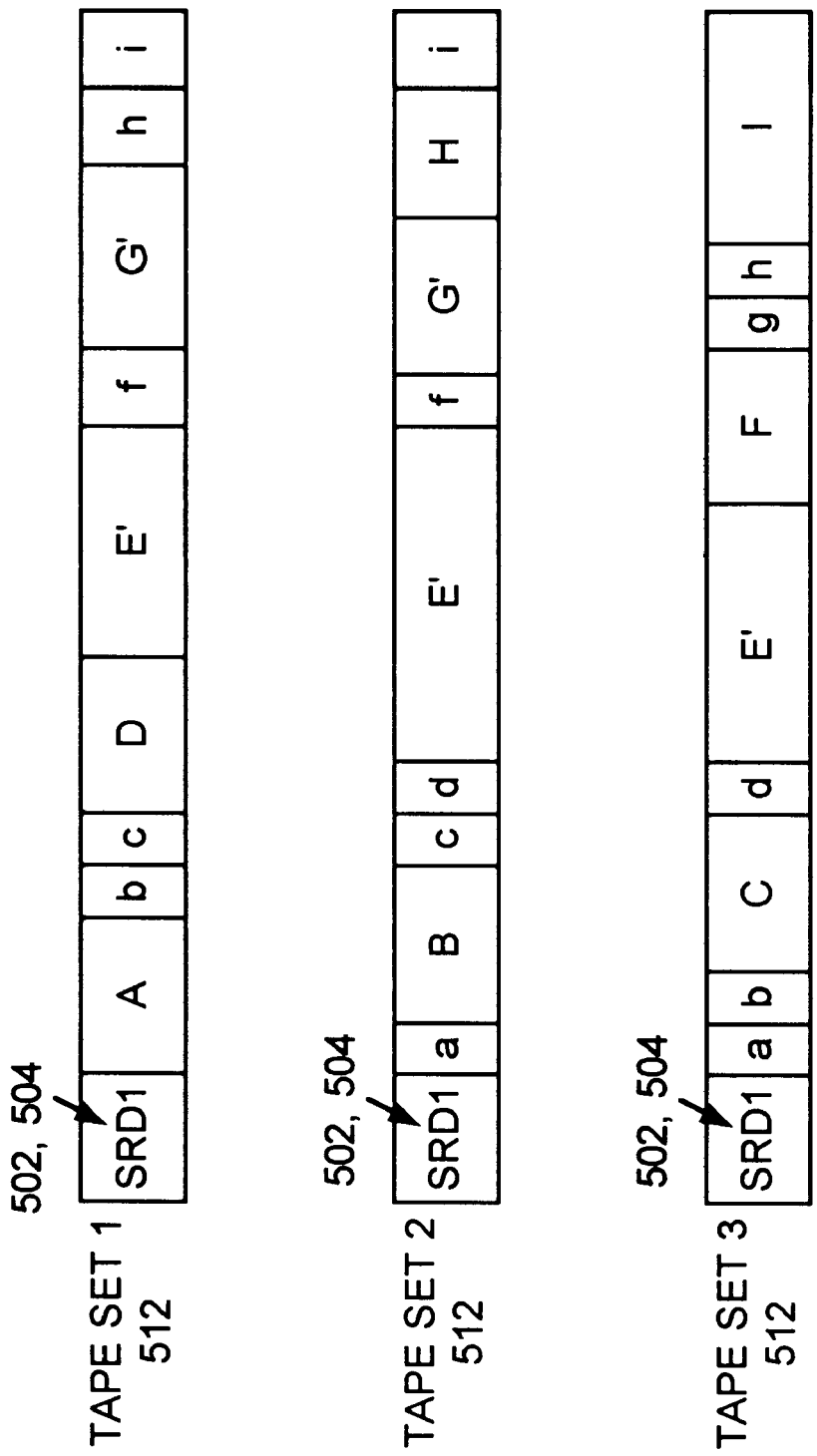

FIGS. 5A and 5B illustrate a format 500 of Save/Restore data of the preferred embodiment. The data is written employing spanned block. That is objects 136 may span multiple File Data Blks 408 and/or multiple objects 136 or parts of an object may exist in a single File Data Blk 408.

Referring now to FIG. 5A, in each File 304, the first object saved is the Save/Restore descriptor object 504 that has been constructed to contain the information required to provide the system with enough information to restore the objects which have been saved following it. In the illustrated example, S/R descriptor object 504 describes objects 508 1 to i. The objects 508 1 through i are written following this Save/Restore descriptor 504. If additional objects, such as objects j to n, are to be saved then additional Save/Restore descriptors 504 are built. The objects described by an additional Save/Restore descriptor 504 are saved following it. This pattern is repeated until all the desired objects have been saved. The subsetting of the objects to be saved into smaller groups, each group described by a particular Save/Restore descriptor object 504 is done to allow the overlapping of the various functional pieces of work involved in saving or restoring the objects. This enhances the performance of the save/restore functions. Each object 508 saved, including the Save/Restore descriptor object 504 has an associated Load/Dump descriptor 502 which precedes the object data to describe the makeup of the object 508 or 504, so that the object can be reconstructed on restore. The Load/Dump descriptor 502 includes information general for all object types and information which is specific to the type of object 508 or 504 that follows.

In accordance with features of the preferred embodiment, rather than creating a single file on the tape media to contain the Save/Restore File Data as done in conventional arrangements, multiple devices 118 advantageously can be employed in parallel so that a file 138 can be opened on each device 118 with the Save/Restore Data (SRD) as shown in FIG. 5B being written concurrently to multiple devices. This allows for the maximum rate at which objects can be saved or restored to be the sum of the data rates of each of the devices being used.

Referring now to FIG. 5B, critical object(s) that identify to the system what objects are in the Save/Restore File Data 136 are written to each file 138 on each device 118 used for the data backup, so that the restore or recovery functions do not require concise knowledge of how the Save/Restore data is distributed across the output devices 118. A replicated object is defined as an object that has all of its data written on each device being used.

Objects that are not critical to controlling the restoring of the following objects can be identified as spread objects. A spread object will have its data somewhere on one or more of the data files being written to concurrently. Even though no data for a spread object exists on a particular data file, the knowledge that an object exists is included in all data files. This allows for a status on each object being saved or restored to have a state on each individual media file. The three states being: 1.) the object data is entirely contained in a media file, 2.) part of the object is contained in the media file. and 3.) no object data contained in the media file although knowledge of the objects existence is present.

In the case where the object data is partially contained in the data file the object description describes the storage requirements for the entire object and also how much of that objects data is on this media file. Any object that has been only partially restored will maintain this information and update the amount of object data restored.

A unique token called the Collaborative File ID 150 is generated by the system and is written with the data describing each object or part of an object on the media so that the integrity of the object will be maintained as it is restored, that is as the pieces of an object are being put back together. The Collaborative File ID is used to assure that only pieces of objects that belong together will be used when reconstructing the object.

FIG. 5B provides an example of how Save/Restore Data Files are formatted when saving data using collaborating devices. The goal is to balance the workload such that all drives will be kept busy and finish at approximately the same time. Assume that a library with several objects 136, some of which may be very large, is saved to three devices. FIG. 5B illustrates how the data, and the time used to save the data, may be spread. In this example objects A, B, C, D, F, H, and I only have object data on one of the volume sets 512. Object E has object data on all volume sets and object G has data on some of the volume sets but not all the volume sets.

The L/D object 502 and SIR descriptor object 504 designated SRD1 has a complete copy written on all tape sets 512. The L/D descriptor object 502 and SIR descriptor object 504 SRD1 is critical in starting the restoring process and having a copy of L/D descriptor object 502 and SIR descriptor object 504 SRD1 on each tape set 512 allows the restore to start using any tape set. Having a copy of L/D object 502 and S/R descriptor object 504 SRD1 on each tape set 512 allows for displaying of the list of objects saved using any single tape set. The letters A through I represent the objects described in descriptors 502, 504 SRD1 as being contained in the save/restore data. X, upper case letter, indicates that all data for object x is contained on this tape set. X', upper case letter with apostrophe, indicates that data for object x is spread across multiple tape sets. x, lower case letter, indicates the knowledge that object x exists in the backup set but has no data on this tape set.

The problems caused by having data being read from multiple volumes 512 without prior knowledge of what to expect on each of the volumes is to handle having some data for an object but not all of it and keeping track of the status for objects that have already been restored from a previously processed volume set or those objects that have not yet encountered object data.

In order to assure data integrity of an object with data being reconstructed from multiple media files 138 requires a unique token to be associated with each piece of the objects data as it is written to the collaborating media files so that an object can only be reconstructed from pieces that provide the image of the object as it existed at save time. This is the role of the unique collaborative file ID 150 for each save. When restoring additional precautions are required to provide uniqueness should multiple restores from duplicated media be performed simultaneously. A unique load group ID 152 is appended to the collaborative file ID 150 to identify the collaborating sessions that will be performing the restore of objects from an individual copy of the backup media.

The validation of the collaborating list of objects to be restored is very similar to that of the save. The tracking information object provides for the sharing of processing and the conflict resolution when more than one session is prepared to do a step of processing that can only be done once. Again the results of the steps processing are available to collaborating sessions to accelerate processing.

Workload balancing is a unique feature provided by the Enhanced Parallel Backup and Recovery methods of the preferred embodiment, when using multiple devices in parallel. The workload balancing is based on the demand from the output device 118. The device 118 is requesting work at a level to keep it saturated. If any interruption occurs such as a need to change physical media volumes other devices 118 continue processing save data and large amounts of data will not be queued up waiting for the interrupted device to resume writing. Rather than spreading the data based on a uniform amount of data on each device 118, the data is distributed based on the speed at which the data can be written to the parallel devices.

The workload balancing feature also allows for variations in the speed at which differing types of data can be gathered for writing to the save/restore media. Fragmentation of an objects data as well as variations in storage technology where the object data is stored can all affect the throughput capabilities of object data gathering. The workload balancing feature also allows for any variation that may occur due to uniqueness of the device 118 and its tape media. As an example, if a tape drive head is dirty and it is using a worn media there may be a high quantity of retries occurring when writing the data. Other drives 118 that are not experiencing this retry activity will naturally request and process a larger volume of data. Thus, the workload balancing feature minimizes the overall save time.

The goal of workload balancing is to minimize the time required by taking maximum advantage of each device 118, adjusting to the real time performance rather than attempting to predict the performance in advance.

The breaking up of the units of data to be written to each device is done to minimize the number of partially restorable objects should a single set of media from the group of media produced by the enhance parallel save be lost. Smaller objects, with small being based on the time required to write the objects data to the media, for example being under a predetermined number of minute(s), are not spread among the parallel devices 118. This minimizes the damaged or lost object data in the event of the inability to read data from the save/restore tape media or the loss of some of the media created using the Enhanced Parallel Backup and Recovery process. Even though no data for an object may exist on the media file 138 written by a device 118 being used by the Enhanced Parallel Backup and Recovery process, some save existence information is written to the media such that the existence of an object as part of the save is known. What this accomplishes is that when restoring using fewer devices 118, a request to restore objects which do not have their data on a particular media, will not fail with a not found condition. In this situation, what is communicated is that the object was included in the save; however, no data for that object is contained on this volume. Likewise if only a portion of an object exists on a particular media, an indication is returned that some object data has been processed but that the object is incomplete at this time.

As additional volume sets are processed there is an indication of the cumulative status of the objects. This allows the caller to know when the final piece of an object is recovered and subsequently when the object is available for use.

Figure 6A:
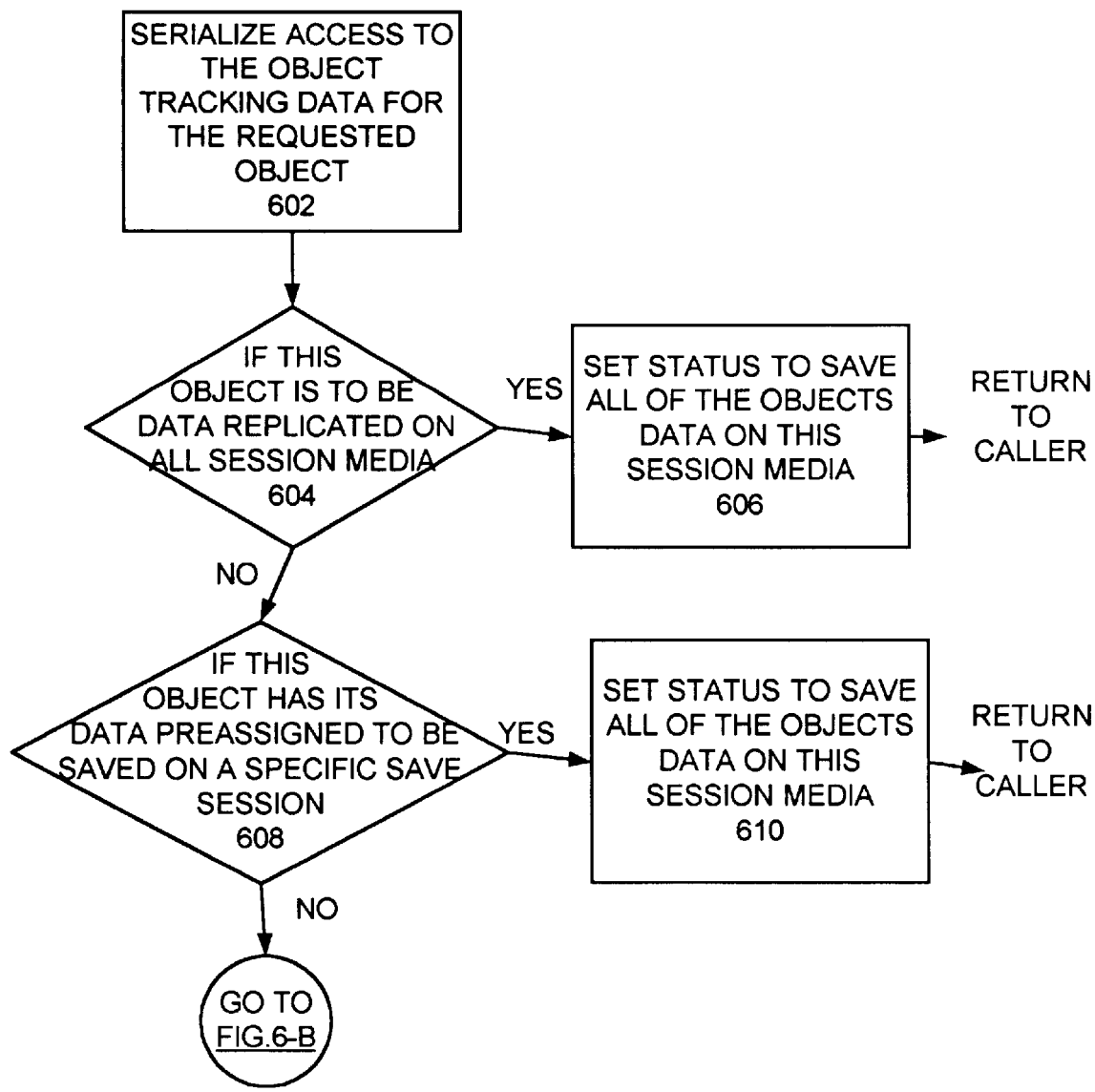
FIGS. 6A, 6B, and 6C are flow charts illustrating operations for dynamically load balancing when saving data to multiple devices of the preferred embodiment.
Figure 6B:
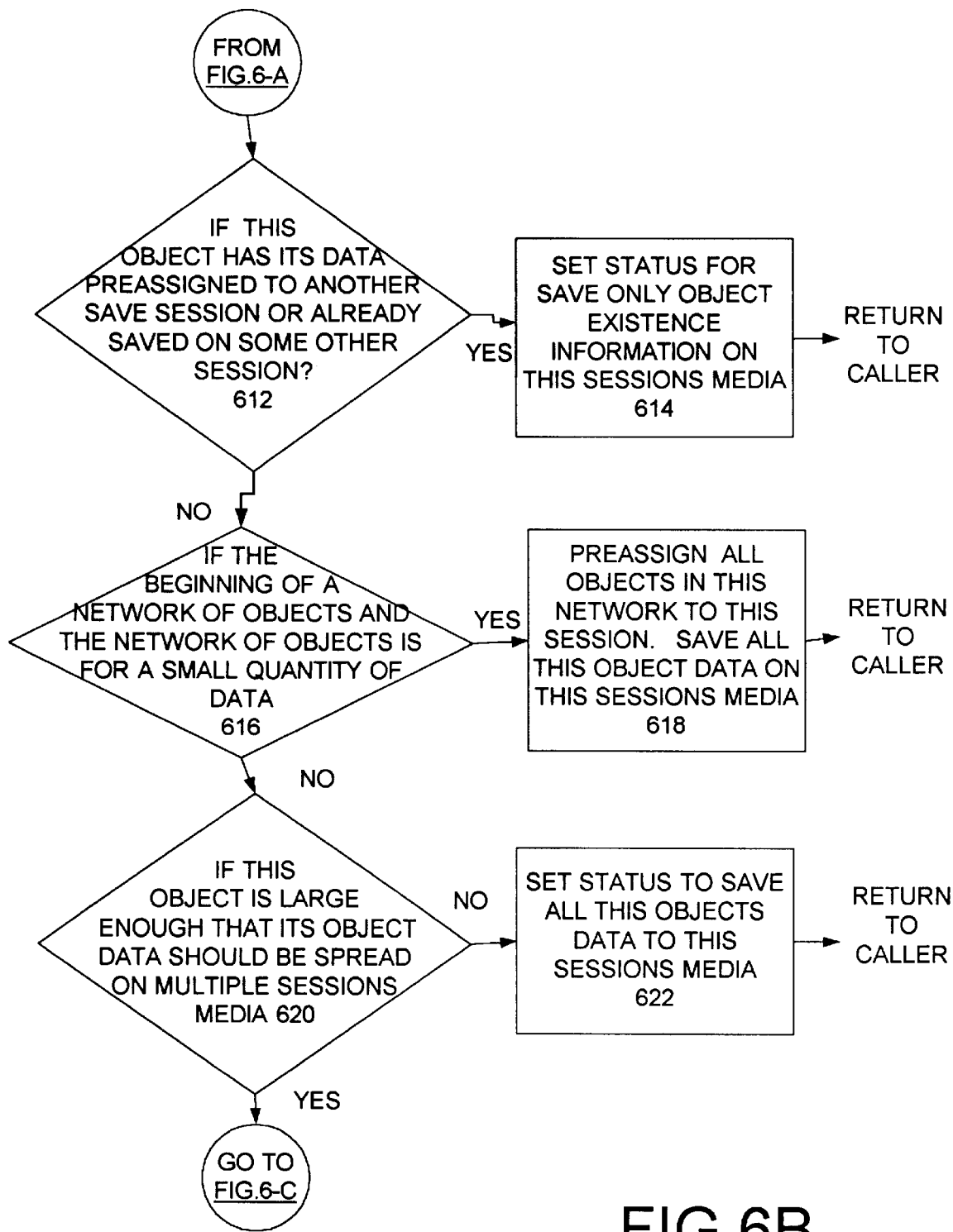
Figure 6C:
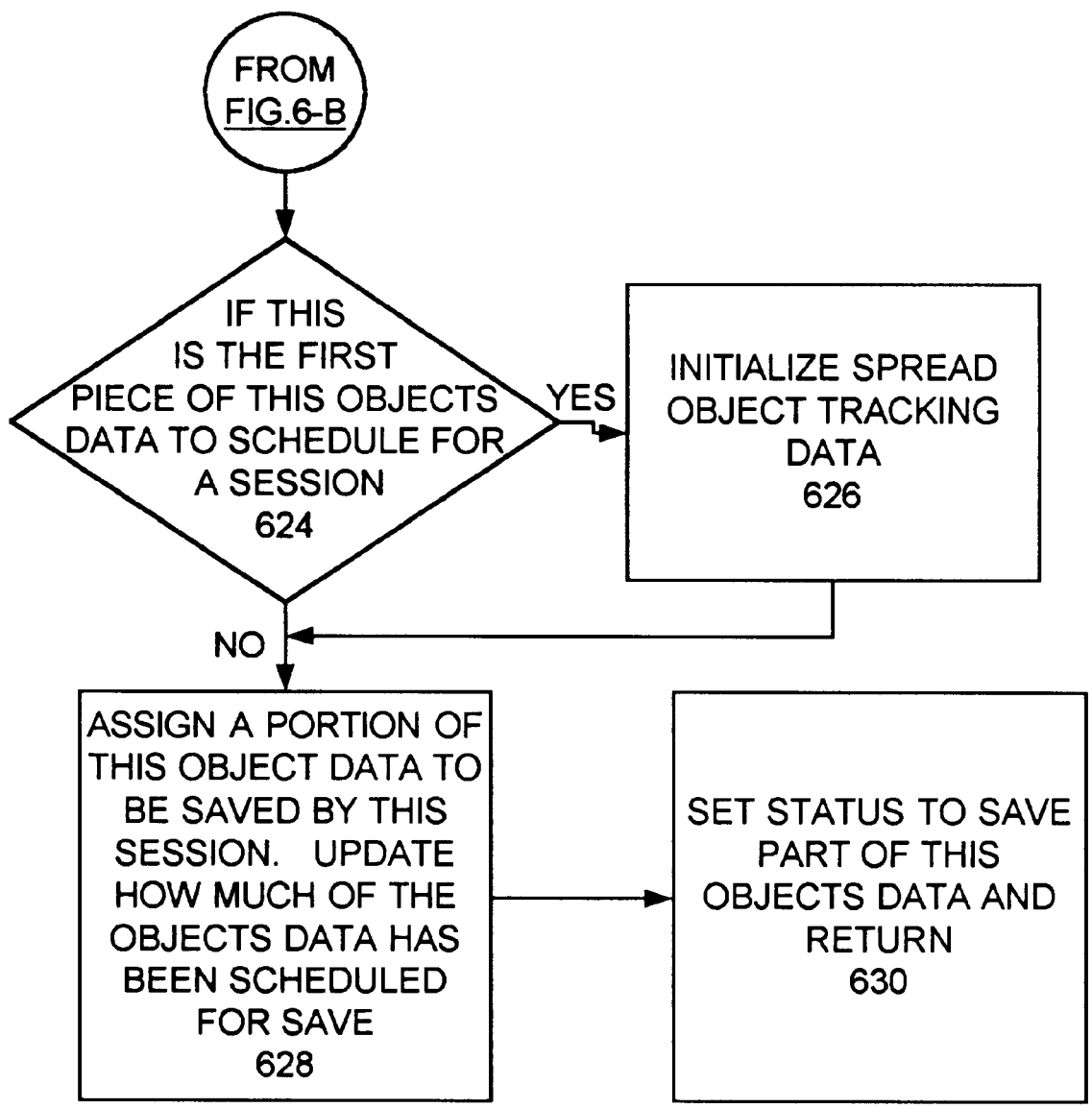

FIGS. 6A, 6B and 6C provide a flowchart of save load balancer function of the Preferred embodiment. The save load balancer function is called by each of the multiple save sessions, each competing to save the same objects data through collaboration. The save load balancer function determines how object data should be processed by each of the calling sessions by using the data in the request object tracking structures 800.

The save load balancer function is called a subsequent time to determine if more object data should be saved by a session if this session had previously saved only a portion of a particular objects data. In this case an indication of save object existence only means that no more object data needs to be saved by this session. Object existence has already been established by virtue of the previous portion of the objects data being saved.

As indicated at a block 602, access to the object tracking data for the object of the request is serialized. Then it is determined if this object is to have its data replicated on all session media as indicated at a decision block 604. If yes, then the status is set to save all of the objects data on this sessions media as indicated at a block 606. Then return to caller. If this object is not to have its data replicated on all session media, then it is determined if this object has its data preassigned to be saved on a specific save session as indicated at a decision block 608. If this object has its data preassigned to be saved on a specific save session, then the status to save all of the objects data on this sessions media is set as indicated at block 610. Then return to caller. Otherwise if this object has not had its data preassigned to be saved on a specific save session, then it is determined if this object has its data preassigned to be saved on another save session or already saved on some other session as indicated at decision block 612. If yes, the status for save only object existence information is set on for this session and on this sessions tape media as indicated at block 614. Otherwise, it is determined if this is the beginning of a network of objects and the network of objects is for a small quantity of data as indicated at a decision block 616. If so, then all objects in this network are preassigned to this session and all of these objects data are saved on this sessions media as indicated at block 618. Then return to caller. Otherwise if this is not the beginning of a network of objects or the network of objects is not for a small quantity of data, then it is determined if this object is large enough that it should be spread on multiple sessions media as indicated at a decision block 620. If this object is not large enough that it should be spread on multiple sessions media, then the status is set to save all this objects data to this sessions media as indicated at a block 622. Otherwise if this object is large enough that it should be spread on multiple sessions media, then it is determined if this is the first piece of this objects data to be scheduled for a session as indicated at a decision block 624. If so, the spread object tracking data is initialized as indicated at a block 626. Then a portion of this object data to be saved by this session is assigned and the amount of the objects data scheduled for save is updated as indicated at a block 628. The status to save part of this objects data is set and then return as indicated at a block 630.

Figure 7B:
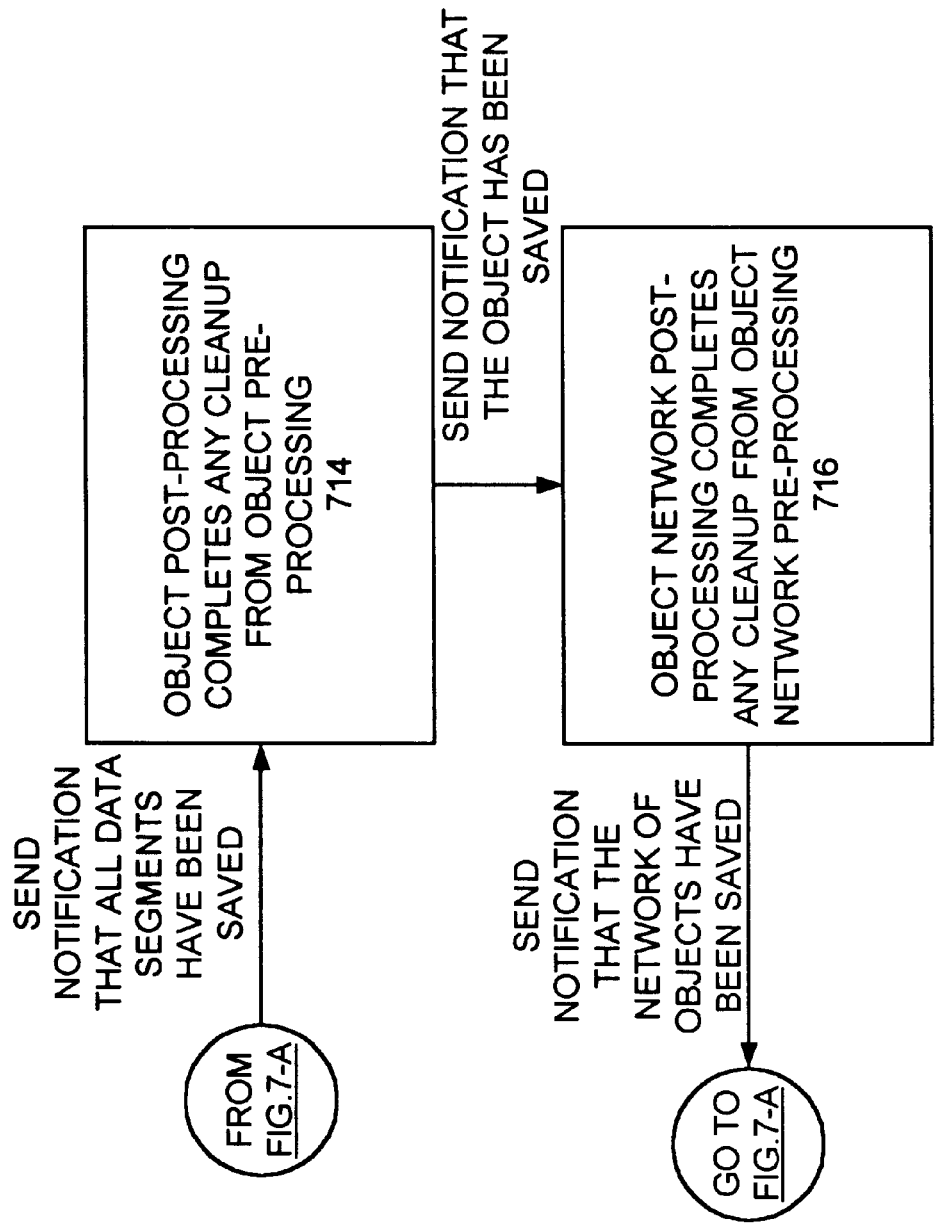

FIGS. 7A and 7B together provide a flow chart illustrating functional operations for data backup for saving data to a single device of the preferred embodiment. In FIGS. 7A and 7B, all arrows going into a box represent a queue for the requests. That is multiple requests maybe queued and work can be underway in all functional block simultaneously. A network of objects is a group of objects that have some affinity with each other. As indicated at a block 702, a list of objects to save is sent as an asynchronous request and includes an object to describe the group of objects being saved.

As indicated at a block 704, a controlling function gets a validated list of objects to save. The controlling function sends a network of objects to an object network preprocessing. The controlling function continues sending networks until the entire list of objects has been processed. It also is handling any messages indicating a network of objects has completed processing. As indicated at a block 706, the object network preprocessor performs any network level processing required and subdivides the work into smaller units of work which is to the granularity of an object level. The object network preprocessor sends a request to process an object to the object preprocessor.

As indicated at a block 708, the object preprocessor performs object level processing and refines the object into information about the object and the units of storage allocations that must be saved in order to have a complete backup of this object. The object preprocessor sends a request with all the object details of the data segments to an I/O management function. As indicated at a block 710, the I/O management function handles the reading of the object data and directs the write of this data to the I/O device. Once the data has been written to the device at block 712, the I/O management function indicates to an object postprocessor that the object has been saved.

As indicated at a block 714, the object postprocessor completes any object level cleanup, if required. The object postprocessor then indicates to a an object network cluster postprocessor that all object level processing is completed. As indicated at a block 716, the object network postprocessor collects the information that all object level processing has been done for a network of objects and then sends notification to the controlling function that the network cluster has been saved.

Figure 8:
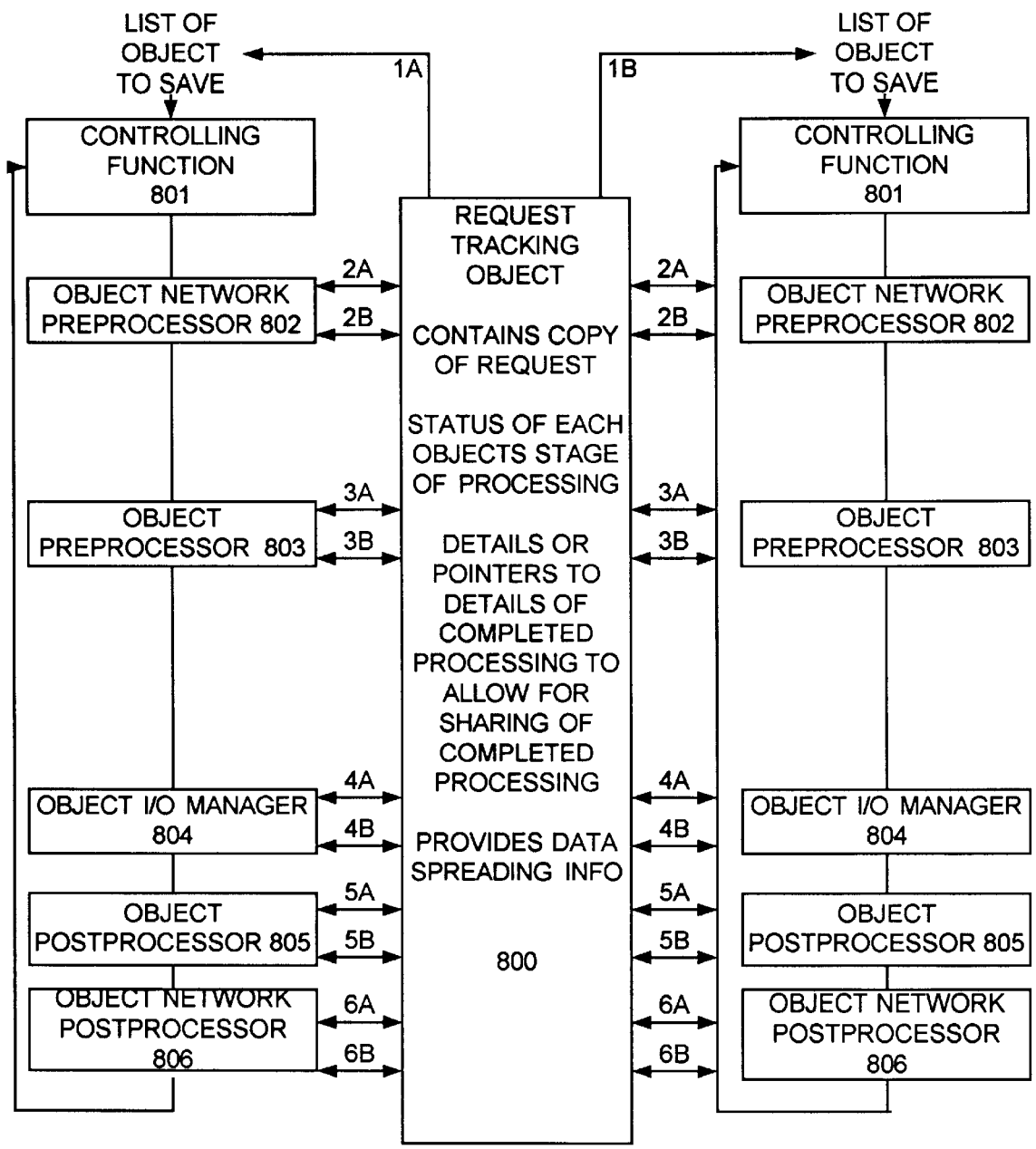
FIG. 8 is a chart illustrating operations for data backup for saving data to multiple devices of the preferred embodiment.

FIG. 8 illustrate the functional operations when saving to multiple devices 118 or collaborating sessions. In FIG. 8, all arrows going into a box represent a queue for the requests so that multiple requests may be queued and work can be underway in all functional block simultaneously. As before, a network of objects is a group of objects that have some affinity with each other. A key part of sharing the workload or arbitrating the work among the collaborating sessions of FIG. 8 is a request tracking object 800. The request tracking object 800 is information that is created and accessed by collaborating sessions with the collaborative file ID being the unique token that ensures sessions are working together on a consistent set of objects.

As indicated at block 801, a controlling function for each session gets a list of object to process at lines 1A and 1B, the controlling functions call the request tracking information object 800 to validate that the request is consistent among the collaborating sessions. The first session to arrive with a request has its list of objects used to prime the tracking information. When subsequent sessions request validation of consistency, their request will be compared with that of the primed tracking information. Since each session can receive multiple lists of objects to process, these lists of objects have an object list sequence associated with the request. Now as collaborating sessions issue additional requests to validate the consistency, the validations are for validation requests of the same object list sequence.

At each stage of processing a request is made by a session to request permission to do that step of processing. If permission to do the step is granted, then upon completion of the processing, each stage of processing updates the request tracking information object 800 with the completion status and any information that must be accessible to other sessions to enable the other sessions to process the next step if permission is granted to that session.

In this implementation, all steps of processing except the I/O step is done by only one of the collaborating sessions. The I/O step, however, is designed to subdivide the work of moving an objects data to the save/restore device in smaller pieces to take advantage of the throughput capabilities of multiple devices 118 in parallel. For simplicity the interaction of the object I/O manager at block 804 with the device I/O driver has not been included in FIG. 8.

When the controlling function gets a validated list of objects to save at block 801, the controlling function sends networks of objects to the object network preprocessing. The controlling function continues sending networks until the entire list of objects has been processed. The controlling function also is handling any messages indicating a network of objects has completed processing. This is generally the same as when only one device is being used. The difference is that the list of objects have been checked to ensure that the lists are the same and a unique collaborative file ID has been included so that the software functions driving each device knows that the software functions are collaborating with other devices to accelerate the save processing of a common list of objects.

At block 802, the object network preprocessor performs any network level processing required and subdivides the work into smaller units of work which is the granularity of an object level. When devices are collaborating prior to working on a network, the network function uses the unique collaborative file ID to check to see if it should do the network processing or if it is being or has been done by another collaborating session. The net effect is the network level processing is only done once and the sessions driving each of the devices being used in parallel will benefit.

At block 803, the object preprocessor performs object level processing and refines the object into the object information and units of storage allocations that must be saved in order to have a complete backup of this object. Likewise when devices are collaborating prior to working on an object the object preprocessor will use the unique collaborative file ID to check to see if it should do the object level preprocessing. So again the work is done once and the software functions for each of the devices being used in parallel benefit.

At block 804, the object I/O manager calls the workload balancer of FIGS. 6A, 6B, and 6C when the object I/O manager needs to know how to handle a particular objects data. Again the three possible states exist: all of the objects' data, part of the objects' data, or existence knowledge of the object only. If the object has already had its data dumped by another session, or for small networks of objects that have been assigned to a session then object existence only information is recorded by this session. If the object is small, or it is a small object in a small network of objects, or it is an object to be replicated to all sessions then the indication is returned to dump the object to this session. If the object is a small object in a small network of objects then all objects in that network will be preassigned to that session. The Enhanced Parallel Backup and Recovery method does not scatter a network of related object across multiple sessions needlessly. The small objects are saved to tape quickly and tracking for parts of a network during the restore mode is minimized, particularly when restoring with fewer devices 118 than the original save.

If the object is large then the object will be designated as a spread object to be done in pieces. The session making the request will be given a piece of the object to dump. The workload balancer records that a piece of the object has been scheduled along with an indication of how much of the object was scheduled. Subsequent requests from this or other sessions for this object continue scheduling out pieces of the object until all pieces of the object have been scheduled. The sessions that were given a piece of the object to process must request permission to do an additional piece of the object upon completion of that piece of the object. If additional data remains to be scheduled the session will be given another piece of the object to process. If other sessions have completed the writing of the objects data, then the session is told there is no more data to write for that object.

Upon completion of writing either a whole object or a piece of an object the object I/O manager then indicates that it has completed the task assigned to it. The purpose of this notification is to indicate eligibility for the next stage of processing for this object.

The object I/O manager function handles the reading of the object data and directing the write of this data to the I/O device 118. Once the data has been written to the device 118, the object I/O manager function indicates to the object postprocessor that the object is on the media. When collaborative processing is being done, the object I/O manager requests from the workload balancer how much if any of the object data it should write to this media. The Collaborative File ID is written on the tape media to provide data integrity when reconstructing an object from the pieces on the multiple media files.

At block 805, the object postprocessor performs object level cleanup that may be required, if any. The object postprocessor then indicates to the object network postprocessor that all object level processing is completed. Likewise when devices are collaborating prior to working on an object the object postprocessor uses the unique collaborative file ID to check to see if it should do the object level postprocessing. So again the work is done once and the software functions for each of the devices being used in parallel benefit.

At block 806, the object network postprocessor collects the information that all object level processing has been done for this network of objects and then lets the controlling function know the network is completed. When collaborative processing is being done the object network postprocessor will check to see on completion of a network whether it should do any network post-processing or not.

A summary for the interactions with the request tracking object 800 indicated by the respective lines in FIG. 8 follows in TABLE 1.

TABLE 1 REQUEST TRACKING OBJECT INTERACTIONS

1A—The first request to validate the list of objects builds and primes the request tracking object and related control structures.

1B—The second request to validate compares its request with the request tracking object to verify the collaboration is operating on the same set of objects.

2A—Object network preprocessor will request permission to do the required processing for the network. If the processing has already been done by a collaborating session then any results of that processing that may be required for this session to proceed will be returned.

2B—If the object network preprocessor processed the network it will upon completion of its processing send an update to the request tracking object with the details that need to be shared so collaborating sessions can access and use that information.

3A—Object preprocessor will request permission to do the required processing for the object. If the processing has already been done by a collaborating session then any results of that processing that may be required for this session to proceed will be returned.

3B—If the object preprocessor processed the object it will upon completion of its processing send an update to the request tracking object with the details that need to be shared so collaborating sessions can access and use that information.

4A—The Object I/O manager will request information on how to process this objects data. It will be told to either dump all the objects data, or a specific subset of the objects data, or to just dump object existence information for the object.

4B—If any object data was processed for an object, the object I/O manager will update the Request Tracking Object upon completion of writing all the data it was told to do. If the object was large and its object data was being spread across multiple sessions then it will also check to see if any object data is remaining to be written. NOTE: A large object is split into reasonable chunks based on an anticipated required time to write that amount of data to the device. It is not simply divided into an equal number of pieces based on the number of sessions working in parallel. The reasonable chunk size is tuneable based on the device speeds and volume capacities.

5A—The object postprocessor will check to see if all the objects data has been processed and if the object postprocessing remains to be done so that object postprocessing will only be done once and only once all object data has successfully been written to the media.

5B—The object postprocessor will update the Request Tracking Object upon completion of the postprocessing for that object.

6A—The object network postprocessor will check to see if all the objects for the network have completed their object postprocessing and has not already had its network postprocessing done.

6B—The object network postprocessor will update the Request Tracking upon completion of the network postprocessing for the network.

A major difference for restore side processing is that object level preprocessing can not be done until either all or part of the object data is encountered on a media. If an object was saved as spread data objects in multiple pieces then the object preprocessing will only be done the first time object data is encountered. On subsequent encounters of data the additional pieces of data will be filled into the object until all the pieces have been processed. After that the object postprocessing could now be done.

In a similar manner the network postprocessing must wait until all objects included in the network have been post processed prior to doing the network post processing. In the event of a canceled or failed restore additional cleanup processing is required to be able to cleanup partially restored objects even though a particular session may have done no part in the processing for those incomplete objects.

Figure 9:
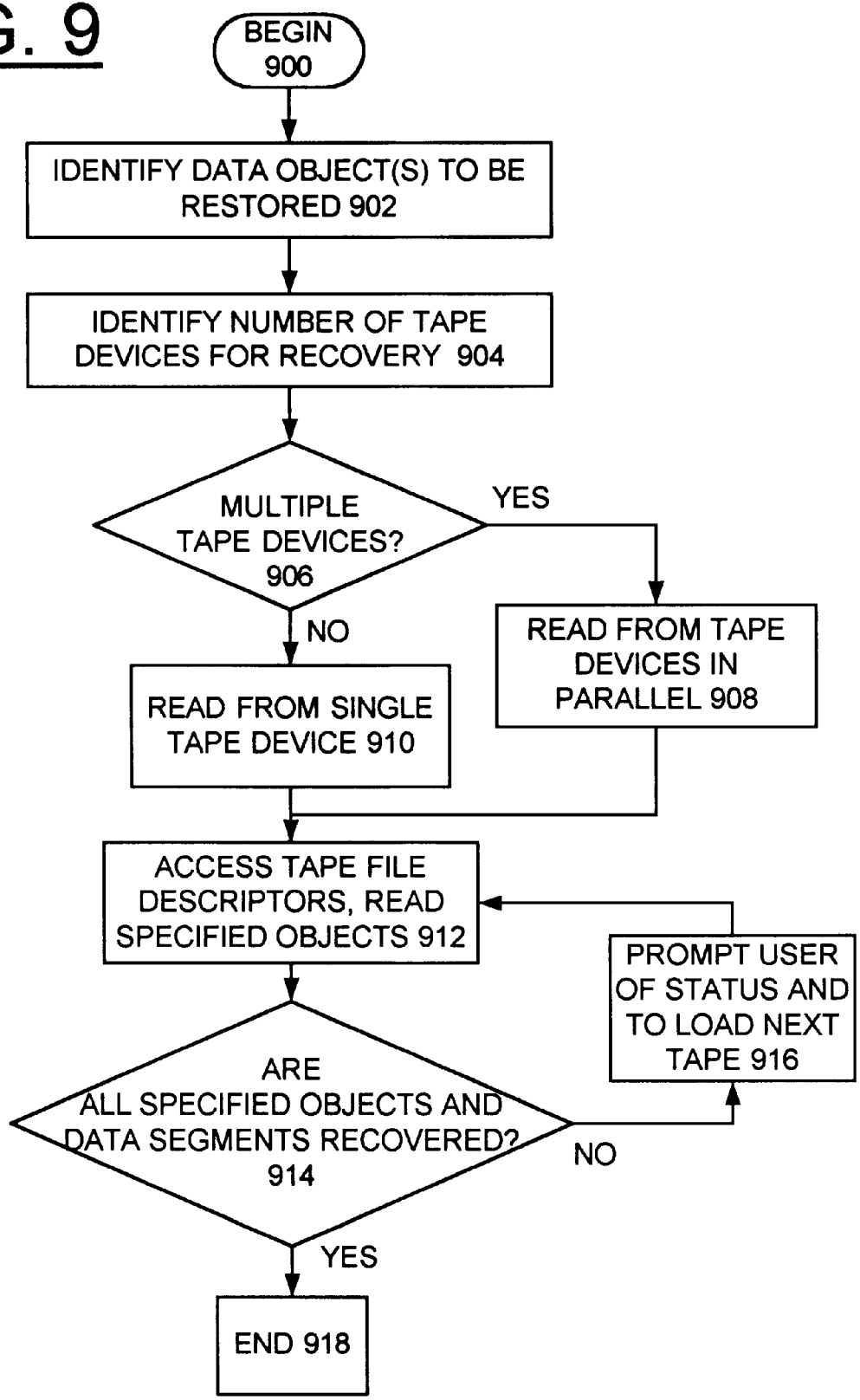
FIG. 9 is a flow chart illustrating sequential operations for data recovery or restoring data from backup tapes of the preferred embodiment.

Referring to FIG. 9, exemplary functional operations for the recovery process are shown. When the user wants to recover one or more objects from the backup tape media onto the DASD 116 recovery commands are used that are provided as part of operating system 130 to recover the data. These recovery commands allow the user to specify an existing media definition 140 that will control the recovery. The media definition 140 contains the same information that was used to control the backup process. However, the specific tape drives 118 and number of tape drives used for the recovery do not need to be identical to those used during the backup process. The recovery can be performed using any number of tape drives from a single tape drive up to the same number of tape drives that were used to perform the backup. The user can mount the tape files 138 on the drives 118 in any order. The use of fewer tape drives during the recovery process is especially critical in several situations. First, the recovery may be performed at a hot site recovery system that does not have as many tape drives 118 as on the system where the backup was performed. Second, the recovery may need to be performed when fewer tape drives 118 are available because of hardware problems or just because the tape drives are being used for another purpose.

As indicated at a block 902, at least one data object to be restored is identified. The number of tape drives to be used is identified as indicated at a block 904. If multiple tape drives to be used identified at decision block 906, the recovery process will read the tape files 138 that are mounted on the specified drives 118 in parallel as indicated at a block 908. Otherwise, the tape file 138 that is mounted on a single drive 118 is read as indicated at a block 910. As indicated at a block 912, the information from the descriptors is accessed to determine which objects or data segments are contained on this specific tape file 138. Small objects are recovered by reading the data from a single tape file 138. Large objects are recovered by reading the data from multiple tape files 138. If multiple tape drives are being used then the objects or data segments are read in parallel from all of the tape drives. The recovery process keeps track of which objects and data segments have been recovered as indicated at a decision block 914. The recovery process will continue to prompt the user to load additional tape files as indicated at block 916 until all of the specified objects and data segments have been recovered.

Figure 10:
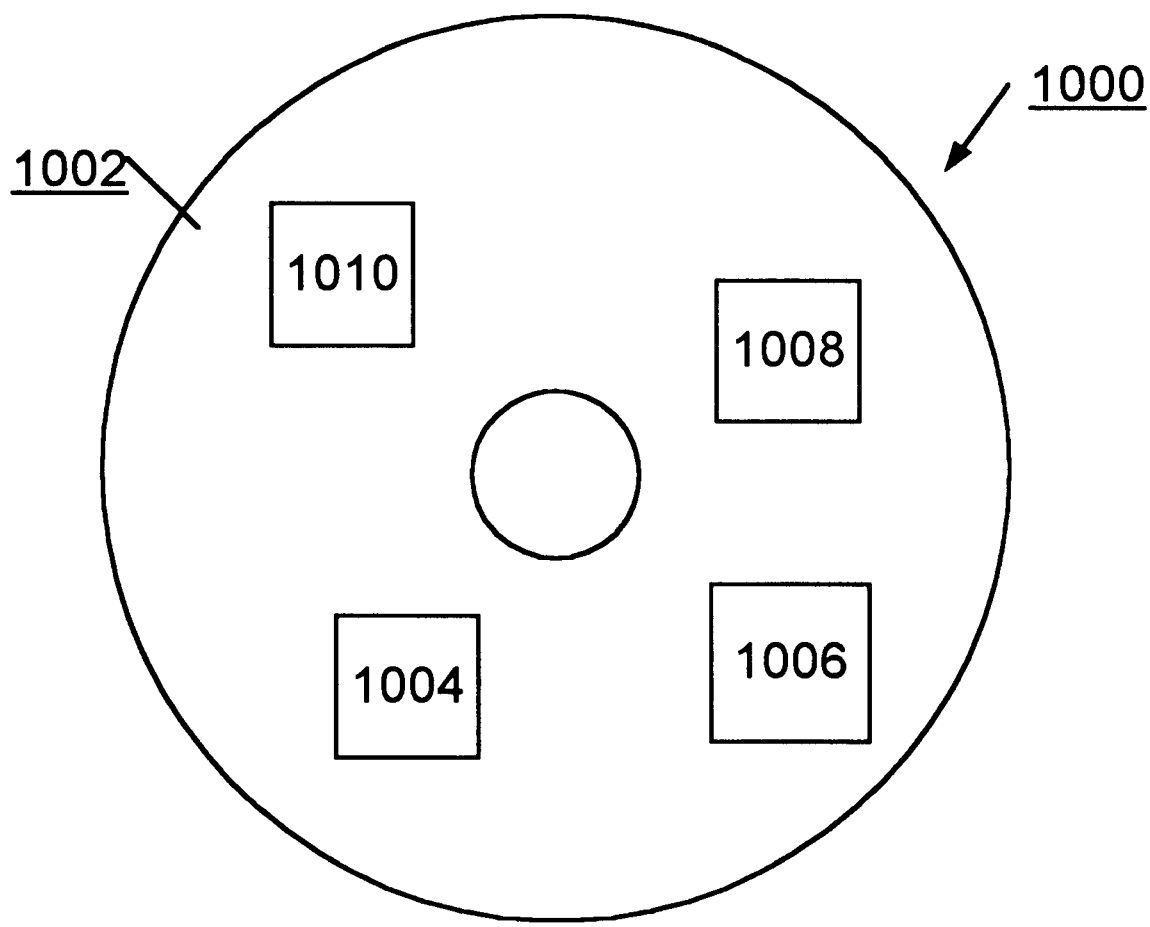
FIG. 10 is a block diagram illustrating a computer program product in accordance with the preferred embodiment.

Referring now to FIG. 10, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the Enhanced Parallel Backup and Recovery methods of the preferred embodiment in the system 100 of FIGS. 1 and 2.

A sequence of program instructions or a logical assembly of one or more interrelated modules defined by the recorded program means 1004, 1006, 1008, 1010, direct the computer system 100 for implementing Enhanced Parallel Backup and Recovery methods of the preferred embodiment.

While the present invention has been described with reference to the details of the embodiments of the invention shown in the drawing, these details are not intended to limit the scope of the invention as claimed in the appended claims.

What is claimed is:

1. A computer implemented method for data backup and recovery using a plurality of tape drives in parallel comprising the steps of:

providing a unique token associated with each data object being saved to a tape media;

saving backup data to the plurality of tape drives and dynamically balancing load between the plurality of tape drives including the steps of utilizing a request object tracking structure and recording when each piece of an object has been scheduled to be saved to one of the plurality of tape drives; receiving a session request and scheduling a piece of the object to the requesting one of the plurality of tape drives until all pieces of the object have been scheduled; and recovering backup data from a tape media, utilizing said unique token for processing a plurality of tape media files in any order.

2. A computer implemented method for data backup and recovery as recited in claim 1 wherein the step of recovering backup data from a tape media, utilizing said unique token for processing tape media files in any order includes the step utilizing the same number or fewer tape drives than the plurality of tape drives used during data saving.

3. A computer implemented method for data backup and recovery as recited in claim 1 includes the steps of providing a load/dump descriptor object for describing each data object being saved in each tape media files, saving said load/dump descriptor object followed by a respective data object being saved, and wherein said load/dump descriptor object includes said unique token.

4. A computer implemented method for data backup and recovery as recited in claim 1 includes the steps of providing a save/restore descriptor object for describing a group of data objects being saved in the tape media files, saving said save/restore descriptor object preceding said group of data objects.

5. Apparatus for data backup and recovery in a computer system using a plurality of tape drives in parallel comprising:

means for providing a unique token associated with each data object being saved to a tape media;

a dynamic load balancer for dynamically balancing load between the plurality of tape drives while saving backup data to the plurality of tape drives; and wherein said dynamic load balancer includes means for utilizing a request object tracking structure and for recording when each piece of an object has been scheduled to be saved to one of the plurality of tape drives; means for receiving a session request and means for scheduling a piece of the object to the requesting one of the plurality of tape drives until all pieces of the object have been scheduled; and processor means for utilizing said unique token for processing tape media files in any order while recovering backup data from a tape media.

6. Apparatus for data backup and recovery in a computer system as recited in claim 5 wherein said processor means for utilizing said unique token for processing tape media files in any order while recovering backup data from a tape media includes means for utilizing an available number of tape drives, said available number being less than or equal to the plurality of tape drives used during data saving.

7. Apparatus for data backup and recovery in a computer system as recited in claim 5 includes means for saving a load/dump descriptor object describing each data object being saved in each tape media files, each said load/dump descriptor object being followed by a respective data object being saved, and said load/dump descriptor object including said unique token and means for saving a save/restore descriptor object for describing a group of data objects being saved in the tape media files, wherein said save/restore descriptor object is saved preceding said group of data objects.

8. A computer program product for data backup and recovery in a computer system, said computer program product including a plurality of computer executable instructions stored on a computer readable medium, wherein said instructions, when executed by said computer, cause the computer to perform the steps of:

providing a unique token associated with each data object being saved to a tape media;

saving backup data to the plurality of tape drives and dynamically balancing load between the plurality of tape drives including the steps of utilizing a request object tracking structure and recording when each piece of an object has been scheduled to be saved to one of the plurality of tape drives; receiving a session request and scheduling a piece of the object to the requesting one of the plurality of tape drives until all pieces of the object have been scheduled; and recovering backup data from a tape media, utilizing said unique token for processing tape media files in any order.

9. A computer program product for data backup and recovery in a computer system as recited in claim 8 wherein said instructions, when executed by said computer, further cause the computer to perform the steps of providing a load/dump descriptor object for describing each data object being saved in each tape media files, saving said load/dump descriptor object followed by a respective data object being saved, and wherein said load/dump descriptor object includes said unique token.

10. A computer program product for data backup and recovery in a computer system as recited in claim 8 wherein said instructions, when executed by said computer, further cause the computer to perform the steps of providing a save/restore descriptor object for describing a group of data objects being saved in the tape media files, saving said save/restore descriptor object preceding said group of data objects.

11. A computer program product for data backup and recovery in a computer system as recited in claim 8 wherein said instructions, when executed by said computer, further cause the computer to perform the steps of utilizing an available number of tape drives, said available number being less than or equal to the plurality of tape drives used during data saving.

* * * * *